United States Patent [19]

Burril et al.

[11] 4,421,796
[45] Dec. 20, 1983

[54] TREATING TEXTILE FIBRES

[75] Inventors: Peter M. Burril, Cowbridge; Stephen Westall, Barry, both of Wales

[73] Assignee: Dow Corning Limited, Barry, Wales

[21] Appl. No.: 422,763

[22] Filed: Sep. 24, 1982

[30] Foreign Application Priority Data

Oct. 3, 1981 [GB] United Kingdom ............... 8129913

[51] Int. Cl.$^3$ ............................................. B05D 3/02
[52] U.S. Cl. .................................. 427/387; 252/8.8; 252/8.9; 427/392; 427/393.1; 427/393.2; 427/393.4; 427/412
[58] Field of Search ................. 252/8.8, 8.9; 427/387, 427/393.4, 393.2, 392, 412, 393.1, 439

[56] References Cited

U.S. PATENT DOCUMENTS

| | | | |
|---|---|---|---|
| 3,632,423 | 1/1972 | Kujuhara | 427/412 |
| 3,677,810 | 7/1972 | Campbell et al. | 427/393.2 X |
| 3,962,500 | 6/1976 | Smith | 427/387 |
| 4,005,030 | 1/1977 | Heckert et al. | 252/140 |
| 4,005,117 | 1/1977 | Heckert et al. | 260/448.8 R |
| 4,006,176 | 2/1977 | Heckert et al. | 260/448.2 N |
| 4,151,327 | 4/1979 | Lawton | 428/447 |

FOREIGN PATENT DOCUMENTS 1175120 12/1969 United Kingdom .
1367666 9/1974 United Kingdom .

Primary Examiner—Thurman K. Page
Attorney, Agent, or Firm—George A. Grindahl

[57] ABSTRACT

The removal of oily soil from textile fibres which have been treated with organosiloxanes, e.g. for improved handle or crease recovery, is facilitated if the fibres are also treated with an organosilane of the general formula $$Y_3SiRN^+(R'')_2R'X^-$$

in which Y is hydrocarbon, alkoxy or alkoxyalkoxy, at least one Y being alkoxy or alkoxyalkoxy, R represents a divalent hydrocarbon or hydrocarbonoxy group, R' represents a monovalent hydrocarbon group or an alkyleneoxy or polyalkyleneoxy group, each R'' represents methyl or ethyl and X represents a halogen atom.

6 Claims, No Drawings

TREATING TEXTILE FIBRES

This invention relates to a process for the treatment of textile fibres and is particularly concerned with improving the soil-release properties of such fibres.

It is known to treat textile fibres to impart resistance to soiling. For example U.K. Pat. No. 1,175,120 discloses that improved antislip, dulling and/or dry-soiling resistance may be imparted to fibrous materials by treatment with a colloidal suspension of a solid silsesquioxane having the unit formula $RSiO_{1.5}$, wherein 5 to 100 percent of the R groups are substituted hydrocarbon radicals containing from 1 to 7 carbon atoms wherein the substituents are amino, mercapto, hydroxyl, epoxy, acrylato, methacrylato, cyano or carboxy groups, and up to 95 percent of the R groups are monovalent hydrocarbon radicals having 1 to 7 carbon atoms or halogenated derivatives thereof.

However, in addition to the dry-soiling referred to in the said U.K. patent, fibrous materials are also susceptible to soiling by oily materials. For example, during wear articles of clothing can become stained with body secretions and foods. Also, during the processing of fibres, such as in the making up of piece goods, the articles may become stained with machine oil. Such stains are not easily removed especially if removal is not attempted quickly. In some cases removal is made more difficult if the fibres have previously been treated with a silicone, for example to impart certain desirable properties such as lubricity and soft handle. This problem is discussed in U.K. Pat. No. 1,367,666 which discloses a method for improving the soil release properties of fabrics by applying in combination a polymethylsiloxane and a water-soluble polymer of an unsaturated carboxylic acid.

We have now found that the removal of soil from silicone-treated textile fibres may be facilitated if in addition to the silicone treatment there is applied to the fibres an organosilane having in the molecule at least one quaternary ammonium salt group. It is known from U.S. Pat. Nos. 4,005,117, 4,005,030 and 4,006,176 that when metallic or vitreous surfaces are washed with detergent compositions containing certain quaternary ammonium silanes soil release benefits are imparted to the surface. In the said patents it is suggested that the benefits obtained result from the formation of a thin siloxane coating on the washed surface. The present invention is, however, concerned with improving the release of oily soil, and the resistance to the redeposition of such soil from fibres having thereon a siloxane coating which has been applied for the purpose of obtaining other properties for example soft handle, lubricity or recovery from creasing.

According to the present invention there is provided a process for the treatment of fibres which comprises contacting the said fibres with both (A) an organosilane of the general formula

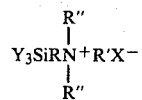

wherein each Y represents a monovalent group having less than 6 carbon atoms selected from hydrocarbon groups, alkoxy groups and alkoxyalkoxy groups, at least one Y being alkoxy or alkoxyalkoxy, R represents a divalent group having from 3 to 10 carbon atoms, the said group being composed of carbon, hydrogen and, optionally, oxygen present in the form of ether linkages and/or hydroxyl groups, R' represents a monovalent hydrocarbon group having from 1 to 15 carbon atoms or the group $(-OQ)_aOZ$, wherein Q represents an alkylene group having 2 or 3 carbon atoms, a has a value of from 1 to 20 and Z represents a hydrogen atom, an alkyl group or an acyl group, each R" represents a methyl or an ethyl group and X represents a halogen atom, and (B) one or more organosiloxanes.

In the above specified general formula the divalent group R is composed of carbon and hydrogen or carbon, hydrogen and oxygen, any oxygen being present in the form of ether linkages and/or hydroxyl groups. The group R may therefore be, for example, methylene, ethylene, hexylene, xylene, $—CH_2CH_2OCH_2CH_2—$ and $—(CH_2)_2OCH_2CHOHCH_2—$. Preferably R represents the groups $—(CH_2)_2—$, $—(CH_2)_4—$ or $—CH_2CH.CH_3CH_2—$. The R' group may be any monovalent hydrocarbon group having from 1 to 15 carbon atoms, for example an alkyl group e.g. methyl, ethyl, propyl, butyl or tetradecyl, an alkenyl group e.g. vinyl, or an aryl, alkaryl or aralkyl group e.g. phenyl, napthyl, tolyl, 2-ethylphenyl, benzyl and 2-phenylpropyl. The R' group may also be the group $—(OQ)_aOZ$ as hereinabove defined, examples of such groups being $—(OCH_2CH_2)OH$, $—(OCH_2CH_2)_3OH$, $—(OCH_2CH_2)_3(OCH_2CH_2CH_2)_3OC_4H_9$ and $—(OCH_2CH_2)_2OC_3H_7$. As the Y substituents there may be present monovalent hydrocarbon groups such as methyl, ethyl, propyl and vinyl, and alkoxy and alkoxyalkoxy groups, for example methoxy, ethoxy, butoxy and methoxyethoxy. At least one Y should be alkoxy or alkoxyalkoxy, the preferred silanes being those wherein the Y substituents are selected from methyl groups and alkoxy or alkoxyalkoxy groups having less than 4 carbon atoms. Preferably also X represents chlorine or bromine.

The silanes (A) are known substances and can be prepared for example by the reaction of a tertiary amine e.g. $C_{15}H_{31}N(CH_3)_2$ with a haloalkylsilane e.g. chloropropyltrimethoxy silane, or by the addition of an unsaturated amine to a hydrosilicon compound followed by reaction of the product with a hydrocarbyl halide or a hydrogen halide.

Component (B) may be any of the organosiloxanes applied to textile fibres to impart desirable properties thereto. Such desirable properties include those of water repellency, lubricity, soft handle, crease resistance and shrink resistance. Generally, organosiloxane (B) will be a polydiorganosiloxane in which at least about 50% of the total silicon-bonded substituents are methyl groups any remaining substituents being other monovalent hydrocarbon groups such as the higher alkyl groups e.g. tetradecyl and octadecyl, phenyl groups, vinyl groups and allyl groups, and monovalent hydrocarbonoxy and substituted hydrocarbon groups, for example alkoxy groups, alkoxyalkoxy groups, fluroalkyl groups, hydroxyalkyl groups, aminoalkyl and polyamino(alkyl) groups, mercaptoalkyl groups and carboxyalkyl groups. Specific examples of such hydrocarbonoxy and substituted hydrocarbon groups are methoxy, ethoxy, butoxy, methoxyethoxy, 3,3-trifluoropropyl, hydroxymethyl, aminopropyl, beta-aminoethyl-gamma-aminopropyl, mercaptopropyl and carboxybutyl. In addition to the aforementioned organic substituents the organosiloxane may have silicon-bonded hydroxyl groups (normally present in terminal silanol groups), or silicon-bonded hydrogen atoms as in, for example, the poly(methylhydrogen) siloxanes and copolymers of dimethylsiloxane units with methylhydrogensiloxane units and/or dimethylhydrogensiloxane units.

In some cases organosiloxane (B) may comprise two or more different types of siloxane, or it may be employed in conjunction with other organosilicon compounds. For example, organosiloxane (B) may comprise both a silanol-terminated polydimethylsiloxane and a crosslinking agent therefor such as a poly(methylhydrogen)siloxane, an alkoxy silane e.g. $CH_3Si(OCH_3)_3$ and/or $NH_2CH_2CH_2NH(CH_2)_3Si(OC_2H_5)_3$ or partial hydrolysates and condensates of such silanes. Thus any of a wide range of organosiloxanes may be employed as organosiloxane (B) depending on the properties desired in the treated fibres. The use of organosiloxanes for the treatment of textile fibres is well known and is described for example in British patent specification Nos. 1,011,027, 1,230,779, 1,425,858, 1,429,263, 1,485,769, 1,491,747 and 1,552,359. Generally preferred as organosiloxane (B) are polydiorganosiloxanes having terminal silicon-bonded reactive groups e.g. hydroxyl and alkoxy groups, employed either alone or in combination with other organosilicon compounds.

It is preferred to apply (A) and (B) together. However, if desired, the fibres may be treated first with (B) and (A) then applied as a separate step, or vice versa. The components (A) and (B), or mixtures of the two, can be applied to the fibres employing any suitable application technique, for example by total immersion or by lick roller. They may be applied from an organic solvent carrier or as an aqueous dispersion or emulsion.

The proportion of component (B) applied to the fibres will depend to some extent on the effect desired. In order to obtain properties such as water repellency, soft handle and shrink resistance the organosiloxane (B) is typically applied in proportions of from about 0.5 to 5% by weight based on the weight of the fibres. The proportion of component (A) employed is not narrowly critical. For optimum results it is preferrd to apply from 0.2% to 2% by weight of (A) based on the weight of the fibres. However, larger or smaller proportions may be employed if desired. Thus a useful improvement in stain resistance can be obtained by the application of as little as 0.1% by weight of (A), although it is believed that increasing the application level above about 4% by weight does not result in any significant further increase in this property. The relative proportions of (A) and (B) which are applied to the fibres will depend to some extent on the degree to which (A) may contribute to the properties, such as handle or water repellency, desired in the fibres. Where such a contribution is possible in the proportion of (B) may be reduced and the desired effect restored by increasing the proportion of (A). In general, however, the total pick up of (A) and (B) will not exceed about five or six percent based on fabric weight.

Following the application of (A) and (B) the fibres may be dried and, where appropriate, the applied composition cured at ambient temperature or by the application of heat. Generally it is preferred to expose the fibres after treatment to temperatures of from about 100° to 200° C.

The process of this invention may be employed to treat a vareity of fibres e.g. cotton, polyester, acrylic and nylon. The fibres may be treated in any form, for example as monofilaments, yarns, random fibres, fabrics and made-up goods. Fibres treated according to this invention exhibit improved oily stain removal properties and resistance to redeposition of the soil during laundering. In addition the treated fibres usually also exhibit a useful improvement in their antistatic properties.

The invention is illustrated by the following examples in which the parts are expressed by weight and Me represents the methyl group.

EXAMPLE 1

A sample of de-sized, scoured 65/35% polyester/cotton fabric was treated by padding through an aqueous emulsion of an α-ω silanol-terminated polydimethylsiloxane (viscosity) > 1,000,000 cP at 25° C.) prepared by emulsion polymerisation, to which had been added dibutyltin di(laurylthioglycollate) as catalyst and a partial hydrolysate of methyltrimethoxy silane. The relative proportions by weight of siloxane:catalyst:hydrolysed silane present in the emulsion were 25:2.5:1. The treating conditions were such as to provide a total add-on of siloxane to fabric of about 1% by weight.

The treated fabric (Sample A) was heated to 150° C. for 3 minutes to dry the fabric and cure the siloxane.

The above described procedure was repeated with a second sample (Sample B) of polyester/cotton except that there was added to the treating emulsion the silane $Me(MeO)_2Si(CH_2)_3N^+Me_2(C_{13}H_{27})Cl^-$ in a proportion of twice the weight of the polydimethylsiloxane. The total add-on of siloxane and silane was 3% based on the weight of the fabric.

Samples A and B, together with an untreated sample (Sample C) were each soiled with melted butter, olive oil, mayonnaise and liquid paraffin. The stains were allowed to set for 16 hours and the soiled fabric pieces then washed in a domestic, automatic washing machine (1800 g load, polyester/cotton programme, 150 g detergent). The fabric pieces were then tumble dried and the degree of soil release measured by comparison with the AATCC stain release replica (AATCC Test—130:1977). The results are shown in the following table in which the ratings are expressed on a scale of from 1 (no soil release) to 5 (total soil release).

| | Soil | | | |
|---|---|---|---|---|
| Sample | Butter | Olive Oil | Mayonnaise | Liquid Paraffin |
| A | 2.5 | 2.5 | 3.3 | 1.8 |
| B | 4 | 5 | 5 | 4.5 |
| C | 3 | 3 | 3 | 3 |

EXAMPLE 2

A scoured, knitted, nylon fabric was treated by padding through an emulsion of a polydimethylsiloxane (10 parts) having silanol and silylmethoxy reactive groups, approximately two silicon-bonded $NH_2(CH_2)_2NH(CH_2)_3—$ groups per molecule and a molecular weight Mn of 35,000. The emulsion also contained a poly(methylhydrogen)siloxane (1.7 parts) and a catalytic amount of dibutyltin di(laurylthioglycollate). Application conditions were such that the pick-up of siloxane solids was 1% by weight, based on the fabric weight. The fabric (Sample D) was then heated for 3 minutes at 150° C. to remove water and cure the siloxane.

The above described procedure was then repeated except that the treating emulsion also contained $(MeO)_2MeSi(CH_2)_3N^+Me_2C_{13}H_{27}Cl^-$ in an amount to provide an additional pick up of 1% by the fabric (Sample E).

The pieces of treated fabric, together with an untreated control sample, were then subjected to the AATCC stain test as described in Example 1. In addition the ability of the fabrics to recover from creasing was measured according to British Standard Specification No. 3086. The results were as follows:

| Sample | Soil Release Rating | | | | Crease Recovery Angle |
| --- | --- | --- | --- | --- | --- |
| | Butter | Olive Oil | Mayonnaise | Liquid Paraffin | |
| D | 1 | 1.5 | 1 | 2.5 | 146° |
| E | 5 | 5 | 5 | 5 | 141° |
| Untreated | 5 | 5 | 5 | 5 | 113° |

The results show that a loss of soil release properties occurs when nylon is treated with aminosiloxane to improve its crease resistance. Addition of the quaternary salt-containing silane substantially restores the original soil release properties of the untreated fabric without significant loss in the improved crease recovery imparted by the aminosiloxane.

The antistatic properties of the samples were evaluated after washing and drying by measurement of their surface resistivity and yielded the following:

| | Surface Resistivity (Ohms) | |
| --- | --- | --- |
| Sample D | 5.6 × 10" | at 66% |
| Sample E | 9 × 10⁸ | Relative |
| Untreated | 1.4 × 10" | Humidity |

EXAMPLE 3

Samples of 65/35% polyester/cotton shirt fabric were treated by the procedure described in Example 2 except that drying and curing was carried out for 30 seconds at 190° C. The fabric samples were designated Sample X (without quaternary silane) and Sample Y (with quaternary silane).

The samples were laundered several times at 60° C. employing a domestic washing machine and detergent. They were then soiled, washed once more and soil release values measured according to the AATCC test as described in Example 1 to yield the following results:

| Sample | Soil | | | |
| --- | --- | --- | --- | --- |
| | Butter | Olive Oil | Mayonnaise | Liquid Paraffin |
| X | 3 | 2.75 | 2.75 | 2 |
| Y | 4.25 | 4.25 | 3.5 | 3 |
| Untreated | 3.5 | 3.5 | 3.25 | 3 |

That which is claimed is:

1. A process for the treatment of fibres which comprises contacting the said fibres with both (A) an organosilane of the general formula

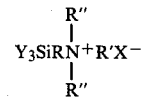

wherein each Y represents a monovalent group having less than 6 carbon atoms selected from hydrocarbon groups, alkoxy groups and alkoxyalkoxy groups, at least one Y being alkoxy or alkoxyalkoxy, R represents a divalent group having from 3 to 10 carbon atoms, the said group being composed of carbon, hydrogen and, optionally, oxygen present in the form of ether linkages, hydroxyl groups or both, R' represents a group selected from monovalent hydrocarbon groups having from 1 to 15 carbon atoms and groups of the general formula $(-OQ)_aOZ$, wherein Q represents an alkylene group having 2 or 3 carbon atoms, a has a value from 1 to 20 and Z represents a hydrogen atom, an alkyl group or an acyl group, each R" represents a methyl group or an ethyl group and X represents a halogen atom, and (B) one or more organosiloxanes.

2. A process as claimed in claim 1 wherein the Y substituents are selected from methyl groups and alkoxy and alkoxyalkoxy groups having less than 4 carbon atoms.

3. A process as claimed in claim 2 wherein X represents chlorine or bromine.

4. A process as claimed in claim 1 wherein organosiloxane (B) comprises a polydiorganosiloxane having terminal silicon-bonded reactive groups.

5. A process as claimed in claim 1 wherein (A) and (B) are applied to the fibres as a mixture.

6. A process as claimed in claim 5 wherein the treated fibres are heated to a temperature of from 100° C. to 200° C.

* * * * *

UNITED STATES PATENT AND TRADEMARK OFFICE
CERTIFICATE OF CORRECTION

PATENT NO. : 4,421,796
DATED : Dec. 20, 1983
INVENTOR(S) : Peter M. Burril, Stephen Westall It is certified that error appears in the above-identified patent and that said Letters Patent is hereby corrected as shown below:

In Column 2, line 19, "—$(CH_2)_2$—," should read
-- —$(CH_2)_3$—, --.

In Column 4, line 16, "(viscosity)" should read -- (viscosity --.

Signed and Sealed this

Second Day of April 1985

[SEAL]

Attest:

DONALD J. QUIGG

*Attesting Officer*     *Acting Commissioner of Patents and Trademarks*